US008936118B2

(12) United States Patent
Gebele

(10) Patent No.: US 8,936,118 B2
(45) Date of Patent: Jan. 20, 2015

(54) EMERGENCY DRIVE FOR A CONSTRUCTION MACHINE AND METHOD FOR OPERATING THE EMERGENCY DRIVE

(71) Applicant: Liebherr-Werk Ehingen GmbH, Ehingen/Donau (DE)

(72) Inventor: Joerg Gebele, Ulm (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 0 days.

(21) Appl. No.: 14/061,257

(22) Filed: Oct. 23, 2013

(65) Prior Publication Data

US 2014/0109562 A1 Apr. 24, 2014

(30) Foreign Application Priority Data

Oct. 23, 2012 (DE) ......................... 10 2012 020 821

(51) Int. Cl.
*F15B 1/027* (2006.01)
*B60K 17/28* (2006.01)
*F15B 1/02* (2006.01)

(52) U.S. Cl.
CPC ..................................... *F15B 1/022* (2013.01)
USPC ..... 180/53.4; 180/53.1; 180/69.6; 137/899.4; 477/52; 60/413

(58) Field of Classification Search
USPC ........... 60/327, 413; 180/53.1–53.8; 219/133, 219/134; 137/899.4; 477/52
See application file for complete search history.

(56) References Cited

U.S. PATENT DOCUMENTS

| | | | | |
|---|---|---|---|---|
| 3,344,879 | A | 10/1967 | Glomb et al. | |
| RE31,500 | E * | 1/1984 | Brownfield | 414/718 |
| 4,815,334 | A | 3/1989 | Lexen | |
| 4,828,452 | A * | 5/1989 | Bolitho | 414/718 |
| 6,015,019 | A * | 1/2000 | Grimes et al. | 180/53.2 |
| 6,336,518 | B1 * | 1/2002 | Matsuyama | 180/306 |
| 6,912,803 | B2 * | 7/2005 | Ichimura | 37/348 |
| 2004/0060206 | A1 * | 4/2004 | Ichimura | 37/348 |
| 2005/0175485 | A1 * | 8/2005 | Udagawa et al. | 417/437 |
| 2006/0096799 | A1 * | 5/2006 | Tatsuno et al. | 180/305 |
| 2008/0122195 | A1 * | 5/2008 | Beeson et al. | 280/151 |
| 2008/0283324 | A1 * | 11/2008 | Iwaki et al. | 180/242 |
| 2009/0100830 | A1 * | 4/2009 | Schneider et al. | 60/413 |
| 2010/0071543 | A1 * | 3/2010 | Mamei et al. | 91/510 |
| 2011/0213534 | A1 * | 9/2011 | Maigler | 701/67 |

FOREIGN PATENT DOCUMENTS

| | | | |
|---|---|---|---|
| DE | 102010055718 | A1 | 6/2012 |
| EP | 0253975 | A1 | 1/1988 |
| EP | 2551234 | A1 | 1/2013 |

* cited by examiner

*Primary Examiner* — Paul N Dickson
*Assistant Examiner* — Darlene P Condra
(74) *Attorney, Agent, or Firm* — Alleman Hall McCoy Russell & Tuttle LLP

(57) ABSTRACT

The present disclosure relates to an emergency drive for a construction machine, comprising a hydraulic motor which is connectable with a pump transfer gearbox of a drive of the construction machine via a first mechanical shaft and a port provided for this purpose.

10 Claims, 2 Drawing Sheets

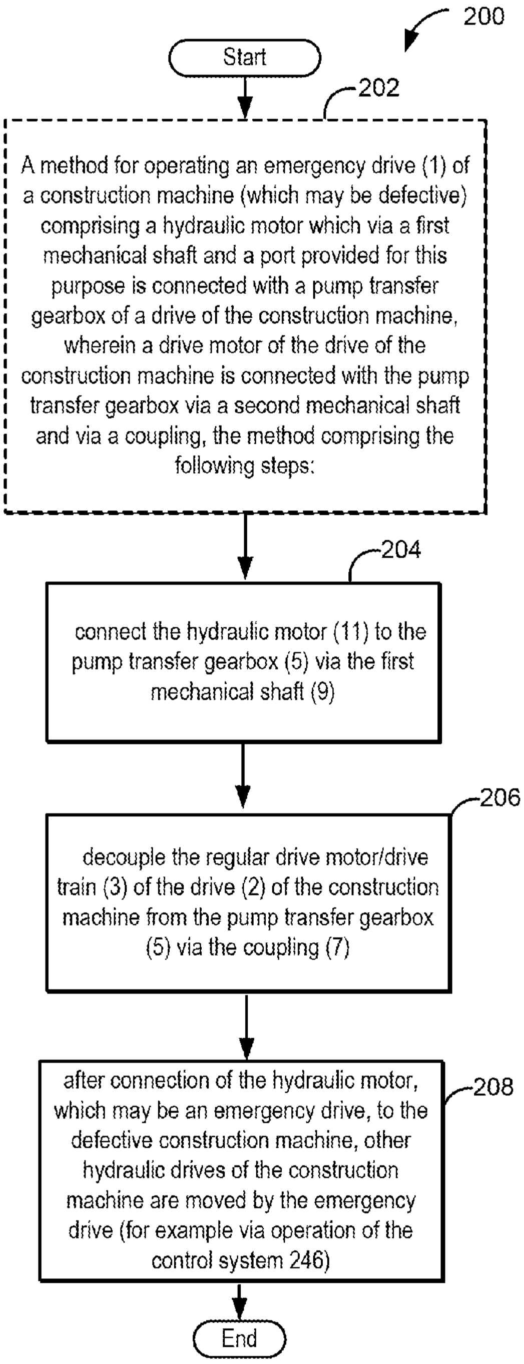
Figure 2
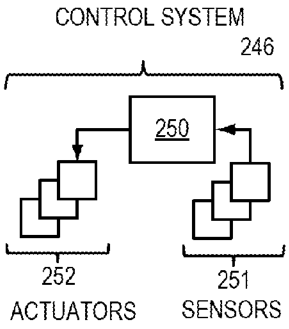

EMERGENCY DRIVE FOR A CONSTRUCTION MACHINE AND METHOD FOR OPERATING THE EMERGENCY DRIVE

CROSS REFERENCE TO RELATED APPLICATION

This application claims priority to German Patent Application Number 10 2012 020 821.9, entitled "Emergency Drive for a Construction Machine and Method for Operating the Emergency Drive," filed on Oct. 23, 2012, which is hereby incorporated in its entirety for all purposes.

TECHNICAL FIELD

This present disclosure relates to an emergency drive for a construction machine and a method for operating the emergency drive.

BACKGROUND SUMMARY

In a typical embodiment, construction machines such as excavators or cranes have a division into undercarriage and uppercarriage. The undercarriage generally serves for traveling the construction machine by a wheel drive or a chain drive. The uppercarriage frequently consists of an operator cabin and the working tool, such as e.g., a crane boom or an excavator arm.

There are known designs in which undercarriage and uppercarriage each are provided with a motor. Other designs however are provided with a single motor located in the undercarriage or uppercarriage, which is utilized for the traveling drive and the working operation of the construction machine.

In the case of a failure of a drive motor of the construction machine a safety aspect consists in that the construction machine can be brought into a safe state. For this purpose, it can be necessary for example that a load must be deposited or a telescopic boom must be retracted or luffed down.

In a construction machine with two motors a connection between the two motors now can exist, via which an undercarriage motor with an uppercarriage motor are available for each other as emergency drives.

In a construction machine in which this possibility does not exist, the problem arises that in the case of a failure of the drive motor the construction machine cannot be brought into a safe state.

Therefore, it should be the object of the present disclosure to be able to bring a construction machine into a safe state in the case of the failure of the drive motor.

According to the present disclosure, this object is solved by an emergency drive for a construction machine. Accordingly, it is provided that an emergency drive for a construction machine comprises a hydraulic motor, wherein the hydraulic motor is connectable with a pump transfer gearbox of a drive of the construction machine via a first mechanical shaft and a port provided for this purpose. In principle, it would also be conceivable to design the emergency drive not with a hydraulic motor, but for example with an electric motor. Among other things, this depends on which energy sources are the most likely to be available in the field of use of the present disclosure and in what way the same can best be utilized for driving the emergency drive. In one exemplary embodiment this is a hydraulic auxiliary drive which drives a hydraulic motor of the emergency drive. For the realization of the present disclosure it merely is decisive that after connection of the emergency drive to a defective construction machine, the hydraulic drives of the construction machine are moved by the emergency drive.

An advantage of the connection of the emergency drive to the pump transfer gearbox via the first mechanical shaft consists in that there is no mixing of oil circuits of the construction machine and of the emergency drive, as would be the case with a hydraulic connection of emergency drive and pumps or actuators. Such mixing can make it necessary to carry out an expensive and environmentally harmful oil change or can even lead to an oil tank flowing over. In addition, a mechanical connection of the emergency drive to the pump transfer gearbox as compared to a solution in which the hydraulics are directly incorporated into the supply circuit of the respective hydraulic actuator means that far less components are required.

For the operation of the emergency drive according to the present disclosure it is advantageous when the regular drive motor of the drive is connectable with the pump transfer gearbox via a second mechanical shaft and via a coupling. When the drive motor or the drive train has a defect, it can happen that the hydraulic pumps which are mechanically connected with the drive motor are blocked by the defective drive motor. In a construction machine designed as crane, for example, the crane boom can therefore no longer be moved. Therefore, it is advantageous to provide a possibility for mechanically separating the blocked drive motor from the pumps by means of the coupling. With the aid of the emergency drive, a pump decoupled in this way then can be moved despite a blocked drive motor.

In an advantageous embodiment, the hydraulic motor of the emergency drive furthermore can be adapted to be coupled with a pressure supply for driving the hydraulic motor. It is conceivable here to design the pressure supply as an internal or external hydraulic auxiliary drive or pressure accumulator. According to the present disclosure it is preferred, however, that the pressure supply comprises a hydraulic auxiliary drive. Here, a pressure medium is provided to the emergency drive via the at least two coupling points. When the emergency drive of another embodiment is not designed with a hydraulic motor, but with an electric motor, no pressure supply, but an electric energy supply via an accumulator or a generator is conceivable for driving the electric motor.

In the emergency drive according to the present disclosure, the hydraulic auxiliary drive can be a hydraulic drive of another construction machine. The advantage here consists in that during the use of construction machines a plurality of construction machines frequently are used in the same region or on the same construction site. When it is necessary now to bring a defective construction machine into a safe state by means of the emergency drive, a further construction machine with comparable performance parameters possibly already is present on site and can easily be utilized as auxiliary drive. It is preferred particularly that the other construction machine is a crane.

It is advantageous when the emergency drive comprises at least two coupling means, at least two connecting lines, at least two coupling points, at least one pressure limiting valve, at least one flow control valve and/or at least one brake valve. As is described here, the hydraulic motor of the emergency drive can be supplied with a pressure medium. In the case in which instead of a hydraulic motor for driving the emergency drive an electric motor is used, the coupling means, coupling points and connecting lines correspondingly can be formed as power connections and lines.

In the formation as hydraulic motor according to the present disclosure, the pressure limiting valve relieves the device in the case of an excessive overpressure, which without a corresponding pressure limiting device might cause damages at the device. Damages which can occur upon exceedance of a maximum speed of the hydraulic motor are avoided by the use of the throttle. According to the present disclosure, the same limits the maximum volume flow and hence the speed of the hydraulic motor. The elements pressure limiting valve and throttle can be provided upstream or downstream of the hydraulic motor and limit the maximum power to be provided by the emergency drive.

The present disclosure furthermore relates to a method for operating an emergency drive. Accordingly, it is provided that the method comprises the following steps:

- connecting the hydraulic motor to the pump transfer gearbox by means of the first mechanical shaft, and
- decoupling the regular drive motor/drive train of the drive of the construction machine from the pump transfer gearbox by means of the coupling.

For operating the emergency drive it is furthermore conceivable to connect the hydraulic motor to the pressure supply.

Further details and advantages of the present disclosure will now be explained in detail with reference to an exemplary embodiment illustrated in the drawing.

BRIEF DESCRIPTION OF THE DRAWINGS

FIG. 2 shows an example method of operation according to the present disclosure.

DETAILED DESCRIPTION

Figure 1:
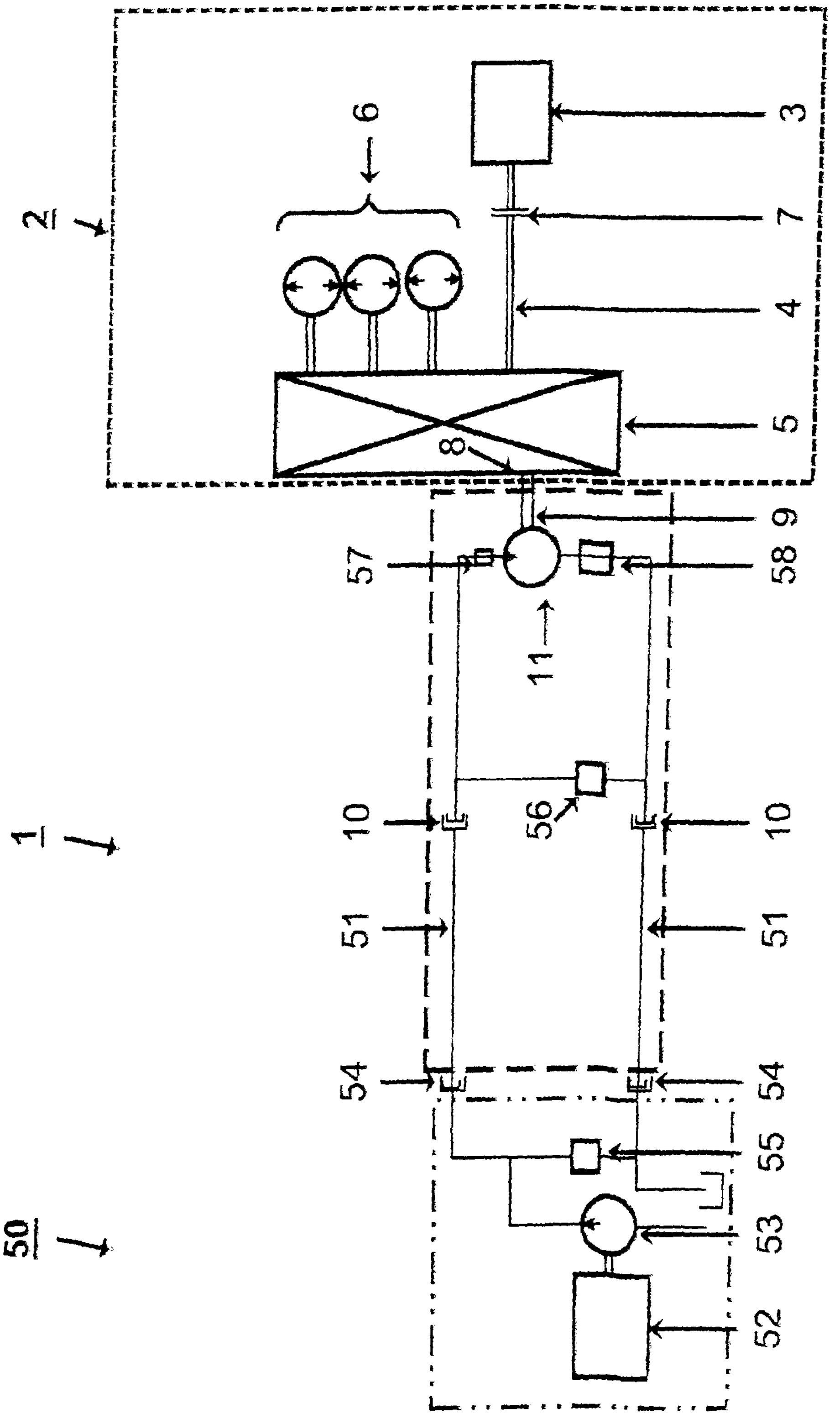
FIG. 1 shows a schematic representation of a construction machine drive with emergency drive according to the present disclosure.

FIG. 1 shows the emergency drive 1 in conjunction with the drive 2 of a construction machine and the hydraulic auxiliary drive 50. The emergency drive 1 comprises the hydraulic motor 11 which via the first mechanical shaft 9 and the corresponding port 8 is connected with the pump transfer gearbox 5 of the drive 2 of the construction machine. For power limitation of the emergency drive 1 there are furthermore provided the throttle 57 for limiting the volume flow and the brake valve 58 in the hydraulic circuit of the emergency drive 1. The pressure limiting valve 56 ensures that no excessive pressure conditions act on the hydraulic system.

The emergency drive 1 furthermore includes coupling means 10 and connecting lines 51, wherein coupling points 54 to the hydraulic auxiliary drive 50 have a type of connection which can be found on larger construction machines as often as possible.

In the illustrated embodiment, the drive 2 of the construction machine comprises three pumps 6 which are connected with loads typical for construction machines. In the case of a crane, the pumps 6 for example can be designed for tilting the crane boom. Via the second mechanical shaft 4 and the coupling 7 the drive motor 3 is connected with the pump transfer gearbox 5, via which the power of the drive motor 3 is distributed to the pumps 6. The pump transfer gearbox 5 furthermore includes the port 8 for connecting the first mechanical shaft 9, which connects the pump transfer gearbox 5 with the hydraulic motor 11.

From the hydraulic auxiliary drive 50 a pressure medium now is passed to the hydraulic motor 11 via the corresponding lines. For this purpose, a hydraulic pump 53 is driven by the drive motor 52 of the auxiliary drive 50, which pressurizes the required pressure medium. In the hydraulic auxiliary drive 50, a pressure limiting valve 55 also can be provided to ensure a safe working pressure.

An example method 200 is shown in FIG. 2. In one example as illustrated at 202, a method for operating an emergency drive of a (defective) construction machine comprising a hydraulic motor which via a first mechanical shaft and a port provided for this purpose is connected with a pump transfer gearbox of a drive of the construction machine, wherein a drive motor of the drive of the construction machine is connected with the pump transfer gearbox via a second mechanical shaft and via a coupling is described. The method comprises at 204 connecting the hydraulic motor to the pump transfer gearbox via the first mechanical shaft. The method also comprises at 206 decoupling the regular drive motor/drive train of the drive of the construction machine from the pump transfer gearbox via the coupling. The method may further include at 208, after connection of the hydraulic motor, which may be an emergency hydraulic drive, to the defective construction machine, the hydraulic drives of the construction machine are moved by the emergency drive (for example via operation of the control system 246). For example, an operator may actuator a control input device which causes a component of the construction machine, e.g., a boom or a excavator arm, to be moved under power of the emergency drive while the control system operates to maintain operation of the construction machine. Such operation is achieved without mixing hydraulic fluids of the emergency drive and the other drive systems of the construction machine.

In one embodiment, the system may include a control system a control system 246. Control system 246 includes a controller 250, which may be an electronic control system of the of the construction machine in which the system is installed. Controller 250 may be configured to make control decisions based at least partly on input from one or more sensors 251, and may control actuators 252, such as the control valves described herein, based on the control decisions. For example, controller 250 may store computer-readable instructions in non-transitory memory, and actuators 252 may be controlled via execution of the instructions based on sensed or estimated information. The stored instructions may include instructions to execute the method of FIG. 2 and/or additional actions as described herein.

The invention claimed is:

1. An emergency drive for a construction machine, comprising a hydraulic motor which via a first mechanical shaft and a port provided for this purpose is connectable with a pump transfer gearbox of a drive of the construction machine, wherein a drive motor of the drive of the construction machine is connectable with the pump transfer gearbox via a second mechanical shaft and via a coupling.

2. The emergency drive according to claim 1, wherein the hydraulic motor can be coupled with a pressure supply for driving the hydraulic motor.

3. The emergency drive according to claim 2, wherein the pressure supply comprises a hydraulic auxiliary drive.

4. The emergency drive according to claim 3, wherein the emergency drive is of a first construction machine and the hydraulic auxiliary drive is a hydraulic drive of a second construction machine.

5. The emergency drive according to claim 4, wherein the second construction machine is a crane.

6. The emergency drive according to claim 1, comprising at least two coupling means, at least two connecting lines, at least two coupling points, at least one pressure limiting valve, at least one throttle and at least one brake valve (58).

7. A method for operating an emergency drive of a construction machine comprising a hydraulic motor which, via a first mechanical shaft and a port provided for this purpose, is connected with a pump transfer gearbox of a drive of the construction machine, wherein a drive motor of the drive of the construction machine is connected with the pump transfer gearbox via a second mechanical shaft and via a coupling, the method comprising the following steps:

connecting the hydraulic motor to the pump transfer gearbox via the first mechanical shaft; and decoupling the drive motor of the drive of the construction machine from the pump transfer gearbox via the coupling.

8. The method according to claim 7, further comprising the step of: connecting the hydraulic motor to a pressure supply for driving the hydraulic motor.

9. The method of claim 8, wherein the pressure supply comprises a hydraulic auxiliary drive.

10. The method of claim 9, wherein the hydraulic motor is an emergency drive, the method further comprising, after connection of the emergency drive to the construction machine, other hydraulic drives of the construction machine are moved by the emergency drive.

* * * * *